United States Patent
Yasunaga et al.

(10) Patent No.: US 6,214,240 B1
(45) Date of Patent: Apr. 10, 2001

(54) METHOD FOR OZONE TREATMENT USING A MIXTURE OF OZONE AND HYDROGEN PEROXIDE

(75) Inventors: Nozomu Yasunaga; Junji Hirotsuji; Seiji Furukawa; Yoshitaka Kawaai; Shigeki Nakayama, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/313,255

(22) Filed: May 18, 1999

(30) Foreign Application Priority Data

May 29, 1998 (JP) .................................................. 10-149608

(51) Int. Cl.$^7$ ....................................................... C02F 1/72
(52) U.S. Cl. ........................... 210/752; 210/758; 210/759; 210/760
(58) Field of Search ................................... 210/759, 752, 210/760, 758

(56) References Cited

U.S. PATENT DOCUMENTS

| | | |
|---|---|---|
| 4,453,953 | 6/1984 | Tanaka et al. . |
| 4,517,849 | 5/1985 | Nakahori et al. . |
| 4,552,659 | 11/1985 | Tabata et al. . |
| 4,617,755 | 10/1986 | Ikeda et al. . |
| 4,817,332 | 4/1989 | Ikeda et al. . |
| 5,076,209 | 12/1991 | Kobayashi et al. . |
| 5,139,625 | 8/1992 | Tanaka et al. . |
| 5,174,793 | 12/1992 | Ikeda et al. . |
| 5,323,567 | 6/1994 | Nakayama et al. . |
| 5,364,537 | 11/1994 | Paillard . |
| 5,431,861 | 7/1995 | Nagahiro et al. . |
| 5,755,977 | * 5/1998 | Gurol ..................................... 210/759 |
| 5,888,271 | 3/1999 | Tanimura et al. . |
| 6,054,102 | 4/2000 | Tanimura et al. . |
| 6,083,464 | 7/2000 | Tanimura et al. . |
| 6,086,772 | 7/2000 | Tanimua et al. . |

FOREIGN PATENT DOCUMENTS

| | | |
|---|---|---|
| 605 277 A1 | 7/1994 | (EP) . |
| 2 563 208 | 10/1985 | (FR) . |
| 2 751 319 | 1/1998 | (FR) . |
| 5228481 | 9/1983 | (JP) . |
| WO 96/09252 | 3/1996 | (WO) . |

OTHER PUBLICATIONS

Perry, Chemical Engineers' Handbook, 5$^{th}$ ed., 1973, p. 5–4.*

Yasunaga et al., "Development of High Efficiency Reaction Apparatus for Ozone Treating Method Using Ozone Mixed with Hydrogen Peroxide", Report at the 34$^{th}$ Assembly of Investigators of Sewerage, 1997, pp. 677–679. (Translation of Reference AR).

Volk et al., "Effects Of Ozone–Hydrogen Peroxide Combination On The Formation Of Biodegradable Dissolved Organic Carbon", Ozone Science & Engineering, vol. 15, Aug. 1993, pp. 405–417.

Shishida et al., "Quantification Of Operational Parameters For TOC Removal In Ozone/Hydrogen Peroxide Water Treatment System", Proceedings of 13th Ozone World Conference, pp. 529–533.

Drage et al., "Pilot Evaluation Of Hydrogen Peroxide Enhanced Ozone Treatment Of A Hard Lowland Surface Water", Proceedings of 11th Ozone World Conference, pp. S–2–72–S–2–85.

(List continued on next page.)

Primary Examiner—Chester T. Barry
(74) Attorney, Agent, or Firm—Leydig, Voit & Mayer, Ltd.

(57) ABSTRACT

Hydrogen peroxide in a hydrogen peroxide reservoir is supplied to an effluent. Ozone gas generated in an ozone generating apparatus is delivered through branched piping to two ozone supplying points and is supplied to the effluent. The ozone and the supplied hydrogen peroxide react to generate hydroxyl radicals. The hydroxyl radicals react with the materials in the effluent to decompose and remove them.

5 Claims, 12 Drawing Sheets

OTHER PUBLICATIONS

Singh et al.; "Pilot–Scale Evaluation . . . Groundwater: A Case Study", The Annual WPCF Conference $63^{rd}$, Oct. 7–11, 1990, Washington DC.

Fehn et al.; "Oxidation biologisch schwer abbaubarer Stoffe mit Ozon", 199a GWF: Das Gas—Und Wasserfach Wasser–Abwasser 136 (1995) No. 6.

"A High Efficiency Reaction Apparatus For Ozone Treating Process, Using Ozone Mixed With Hydrogen Peroxide", 38th Assembly of Investigators of Sewerage, 1997, pp. 677–679.

* cited by examiner

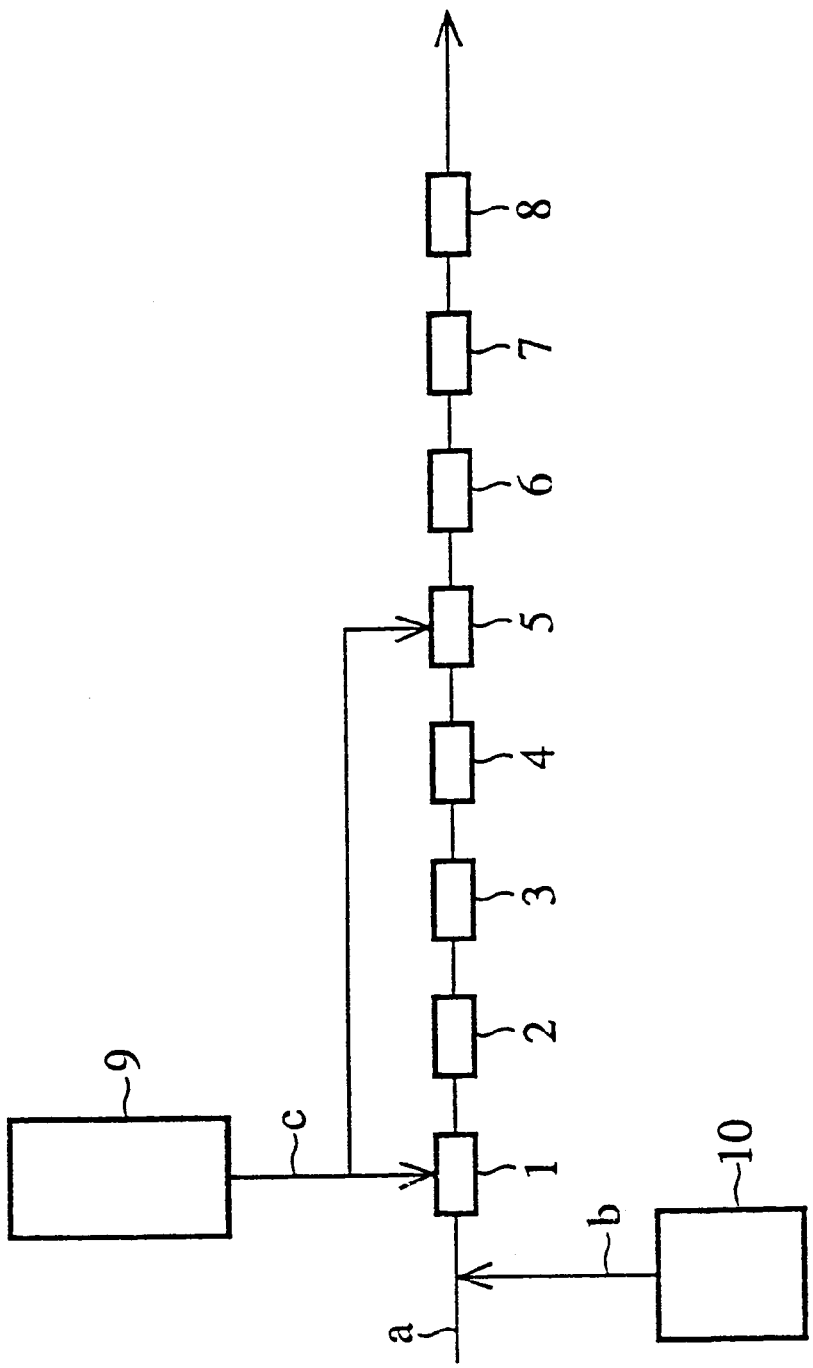

PRIOR ART
FIG.2

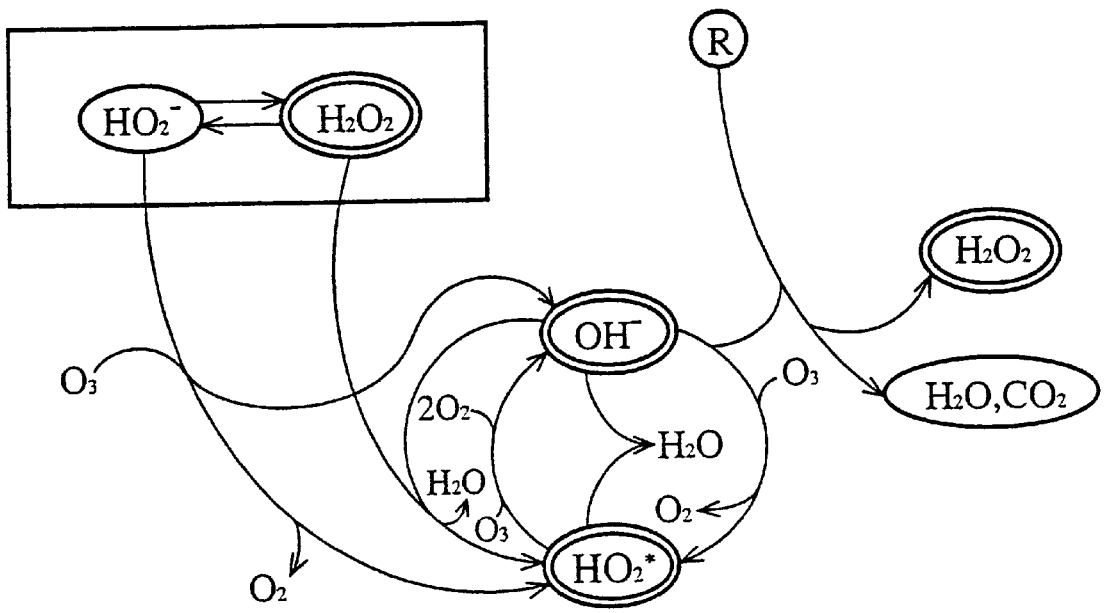

INITIATION $$H_2O_2 + H_2O \rightleftarrows H_3O^+ + HO_2^- \quad \cdots (1)$$

$$HO_2^- + O_3 + H^+ \rightarrow OH^* + HO_2^*(O_2^{*-}) + O_2 \quad \cdots (2)$$

PROPAGATION $$OH^* + O_3 \rightarrow HO_2^*(O_2^{*-}) + O_2 \quad \cdots (3)$$

$$HO_2^*(O_2^{*-}) + O_3 \rightarrow OH^* + 2O_2 \quad \cdots (4)$$

$$HO^* + H_2O_2 \rightarrow HO_2^*(O_2^{*-}) + H_2O \quad \cdots (5)$$

TERMINATION $$OH^* + HO_2^*(O_2^{*-}) \rightarrow H_2O + O_2 \quad \cdots (6)$$

$$OH^* + R \rightarrow H_2O_2 + H_2O + CO_2 \quad \cdots (7)$$

METHOD FOR OZONE TREATMENT USING A MIXTURE OF OZONE AND HYDROGEN PEROXIDE

BACKGROUND OF THE INVENTION

1. Field of the Invention

The present invention relates to a method and an apparatus for the ozone treatment of effluent, using ozone mixed with hydrogen peroxide, in which effluent is treated by ozone mixed with a little hydrogen peroxide, particularly, to such a method and an apparatus, which improve the ozone performance without reducing the efficiency of the removal of the total organic carbon (hereinafter called TOC) from effluent.

The term "ozone performance" means amount of ozone for treating unit amount of TOC, and is expressed as $\Delta O_3/\Delta TOC$ in this specification and claims.

2. Description of the Prior Art

Japanese Patent Application JP-A-5-228481 discloses an ozone treatment using ozone mixed with hydrogen peroxide, in which hydroxyl radicals (OH radical) are effectively generated as a product of a reaction between the ozone and the mixed hydrogen peroxide. The hydroxyl radical possesses far stronger oxidizing and decomposing power than that of hydrogen peroxide or ozone, and can decompose and remove persistent substances in effluent.

The OH radicals and the $HO_2$ radicals indirectly react in the presence of intermediary ozone molecules in the effluent, and they form a complex chain reaction system.

It is considered that following processes occur simultaneously in the effluent under the ozone treatment using ozone mixed with hydrogen peroxide:

An initiation process to generate radicals as a product of the ozone and the hydrogen peroxide;

A propagation process to advance the chain reaction, consuming the radicals in the presence of intermediary ozone;

And a termination process, in which the OH radicals react with the organic compounds in the effluent.

The reaction in the ozone treatment using ozone mixed with hydrogen peroxide is very complex, because many reactions simultaneously take place and the reactions interfere to each other. Thus the control of the reaction, which involves radical reactions, was very difficult. For example, by simply increasing the concentration of the ozone, the TOC in effluent can be decreased, on other hand, the ozone performance in the treatment declines, namely the amount of ozone $O_3$ for treating unit amount of TOC increases.

Moreover, the operation conditions for the ozone treatment, for example, the quantity of the hydrogen peroxide, the concentration of ozone, etc, are not optimized. Additionally, the optimal conditions for the ozone treatment, in case that ozone gas is injected into effluent at many injection points, are entirely unknown.

Thus, the ozone treatment using ozone mixed with hydrogen peroxide is so estimated that it is not advantageous from an economical point of view and it is difficult to control from a technical point of view.

SUMMARY OF THE INVENTION

An object of the present invention is to eliminate these drawbacks of the ozone treatment using ozone mixed with hydrogen peroxide in the prior art.

Another object of the present invention is to propose a method and apparatus for ozone treatment using ozone mixed with hydrogen peroxide, which has a high efficiency to decompose the organic compound in the effluent, and simultaneously allow to reduce the value of $\Delta O_3/\Delta TOC$, so that the method and the apparatus have high cost performance from an economical point of view and practical from a technical point of view.

In a method of ozone treatment using ozone mixed with hydrogen peroxide according to the present invention, wherein ozone and hydrogen peroxide are mixed into effluent to decompose organic compounds in the effluent, the concentration of ozone to be injected ranges 30 to 300 mg/L.

In another method of ozone treatment using ozone mixed with hydrogen peroxide according to the present invention, ozone and hydrogen peroxide are mixed into effluent to decompose organic compounds in the effluent, the rate of ozone injected ranges 10 to 150 mg/L.

In another method of ozone treatment using ozone mixed with hydrogen peroxide according to the present invention, wherein ozone and hydrogen peroxide are mixed into effluent to decompose organic compounds in the effluent, the flow rate ratio (flow rate of ozone gas/flow rate of effluent) ranges 0.1 to 1.0.

In another method of ozone treatment using ozone mixed with hydrogen peroxide according to the present invention, wherein ozone and hydrogen peroxide are mixed into effluent to decompose organic compounds in the effluent, the rate of hydrogen peroxide injected ranges 1 to 50 mg/L.

In another method of ozone treatment using ozone mixed with hydrogen peroxide according to the present invention, wherein ozone and hydrogen peroxide are mixed into effluent to decompose organic compounds in the effluent, the time interval of ozone injection ranges 5–40 second.

In another method of ozone treatment using ozone mixed with hydrogen peroxide according to the present invention, wherein ozone and hydrogen peroxide are mixed into effluent to decompose organic compounds in the effluent, the volumetric mass transfer coefficient of ozone $K_L a$ ranges 100 to 10 000 (1/h).

In another method of ozone treatment using ozone mixed with hydrogen peroxide according to the present invention, wherein ozone and hydrogen peroxide are mixed into effluent, in a manner as mentioned above, to decompose organic compounds in the effluent, the ozone is injected into the effluent at least two ozone injection points.

An apparatus for ozone treatment using ozone mixed with hydrogen peroxide according the present invention implements one of the aforementioned method for decomposing organic compounds in effluent.

BRIEF DESCRIPTION OF THE DRAWINGS

FIG. 1 is a block diagram of an apparatus for treating effluent by ozone mixed with hydrogen peroxide, which is a model used in our computer simulations.

FIG. 2 is a schematic diagram of reactions in the ozone treatment using ozone mixed with hydrogen peroxide, and the chemical equations in the ozone treatment.

DETAILED DESCRIPTION OF THE PREFERRED EMBODIMENT

Figure 3:
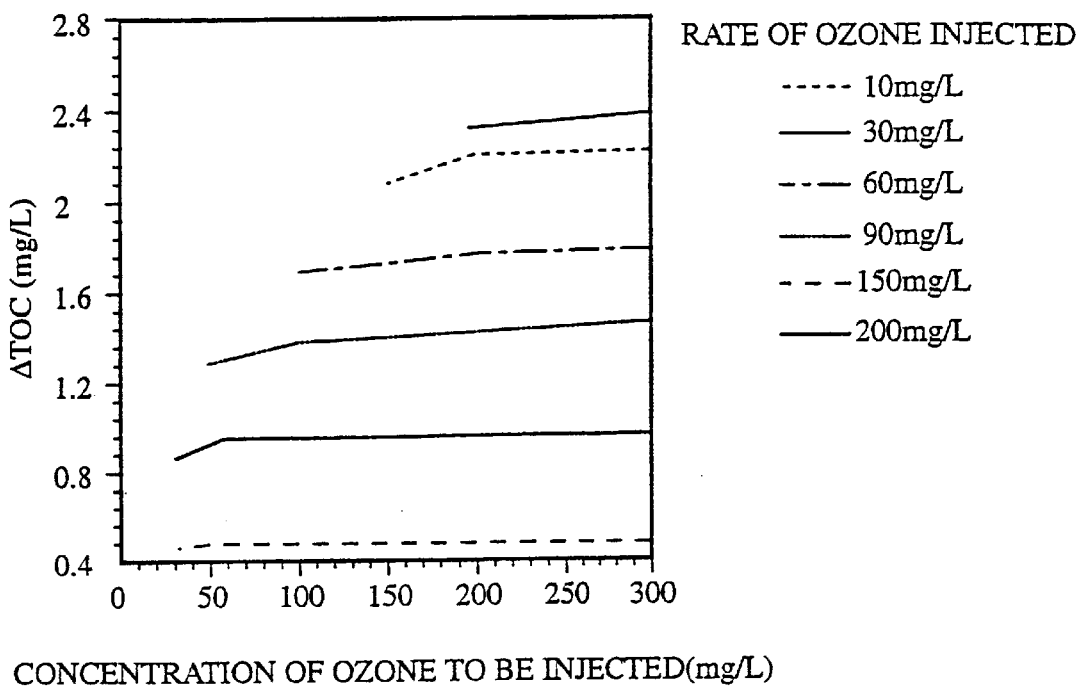
FIG. 3 shows the $\Delta TOC$ as a function of the concentration of ozone to be injected at various rates of ozone injected.

We, the inventors, investigated the ozone treatment by ozone mixed with hydrogen peroxide, to find conditions to reduce the ratio $\Delta O_3/\Delta TOC$ and simultaneously to improve the efficiency of decomposition and removal of organic compounds in the effluent. For this purpose, computer simulations based on a dynamical model of the chain reactions are repeatedly performed. And, we found some important phenomena in these reaction system, and reached to the present invention.

FIG. 1 is a block diagram of an apparatus for treating effluent by ozone mixed with hydrogen peroxide, which is a model used in our computer simulations. FIG. 2 is a schematic diagram of reactions in the ozone treatment using ozone mixed with hydrogen peroxide, and the chemical equations at the different phases of the chain reactions in the ozone treatment. FIGS. 1 and 2 are disclosed in the "Report at the $34^{th}$ assembly of investigators of sewerage", pages 677–679 (1997).

We, the inventors, performed a computer simulations based on the chemical equations (1) to (7) shown in FIG. 2, which are supposed to represent the reaction to decompose organic compounds in the ozone treatment by ozone mixed with hydrogen peroxide. Reference R in FIG. 2 denotes organic compounds in the effluent.

Referring to FIG. 1, the flow direction of effluent in effluent piping (not shown) is represented by an arrow a. Hydrogen peroxide is reserved in a hydrogen peroxide reservoir 10. The flow direction of hydrogen peroxide flowing in hydrogen peroxide piping (not shown) is represented by an arrow b. Ozone gas is generated by a ozone generator 9, and can be injected into the effluent at the ozone injection points 1–8. The flow direction of ozone gas in ozone piping (not shown) is represented by an arrow c. FIG. 2 shows a case that ozone gas is injected into the effluent at two injection points 1, 5.

The computer simulations were performed mainly for the cases that the ozone gas is injected into the effluent at two injection points, however, the results obtained off the simulations can be generalized independently from the number of the injection points. Nevertheless, it is preferable to inject ozone at more than two injection points, because in such a case the quantity of decomposed and removed TOC (hereinafter referred ΔTOC) increases, and as a result, the ratio $\Delta O_3/\Delta TOC$ declines. In the simulations, it is supposed that the effluent and the injected ozone are completely mixed.

The ozone treatment using ozone mixed with hydrogen peroxide in the apparatus shown in FIG. 1 is explained below The effluent to be treated flows through effluent piping in the direction a, and hydrogen peroxide is supplied to hydrogen peroxide piping from the hydrogen peroxide reservoir 10 and mixed into the effluent.

The ozone generating apparatus 9 generates ozone gas from air, oxygen gas or oxygen rich gas. The generated ozone gas is supplied through branched piping to two ozone injection points 1, 5, where the ozone gas is injected into the effluent. The injection of ozone is carried out by blasting the ozone gas in a form of fine bubbles into the effluent so that the ozone can be easily resolved into the effluent. The effluent is highly treated in the section between the points 1 to 8, where the resolved ozone and the hydrogen peroxide react to generate OH radicals, which decompose and remove the organic compounds contained in the effluent.

Factors which are considered to influence to the result of computer simulation of ΔTOC and the ratio $\Delta O_3/\Delta TOC$ are listed in Table 1. In this specification and claims, the term "concentration of ozone gas to be injected" means the mass of ozone (measured in mg) in a liter of ozone containing gas to be injected into the effluent. The term "rate of ozone gas injected" means the mass of ozone (measured in mg) injected into a liter of effluent. The term "rate of hydrogen peroxide injection injected" means the mass of hydrogen peroxide (measured in mg) injected into a liter of effluent.

TABLE 1

| | Factors | VALUE |
|---|---|---|
| EFFLUENT | flow rate (L/min) | 10 |
| | TOC (mg/L) | 3.0–20.0 |
| | water temperature (C.) | 25 |
| | pH (–) | 6–9 |
| OZONE GAS | concentration in the gas (mg/L) | 30–300 |
| | total flow rate (L/min) | 0.1–10.0 |
| | time interval of injection (second) | 2–40 |
| | volumetric mass transfer coefficient of ozone (1/h) | 100–20000 |
| | rate in the effluent (mg/L) | 10–300 |
| RATE OF HYDROGEN PEROXIDE INJECTED (mg/L) | | 5–40 |

Embodiments of the present invention are explained below, referring to the figures.

Embodiment 1

FIG. 3 shows the $\Delta$TOC of effluent, after the ozone treatment using ozone mixed with hydrogen peroxide, as a function of the concentration of ozone to be injected at various rates of ozone injected, when an ozone treatment of effluent (containing 6.0 mg/L of TOC) is accomplished using an apparatus shown in FIG. 1 under conditions that the rate of hydrogen peroxide injected is 20 mg/L and the rate of ozone injected is varied to be 10, 30, 60, 90, 150, and 200 mg/L.

It can be seen from the figure that the value of $\Delta$TOC does not change at a range over a certain value of the concentration of ozone to be injected. In fact, the values of $\Delta$TOC are nearly constant at the ranges over 60, 100, 150, 180, 200, 250 mg of the concentration of ozone to be injected, when the rates of ozone injected are 10, 30, 60, 90, 150, 200 mg/L, respectively.

Figure 4:
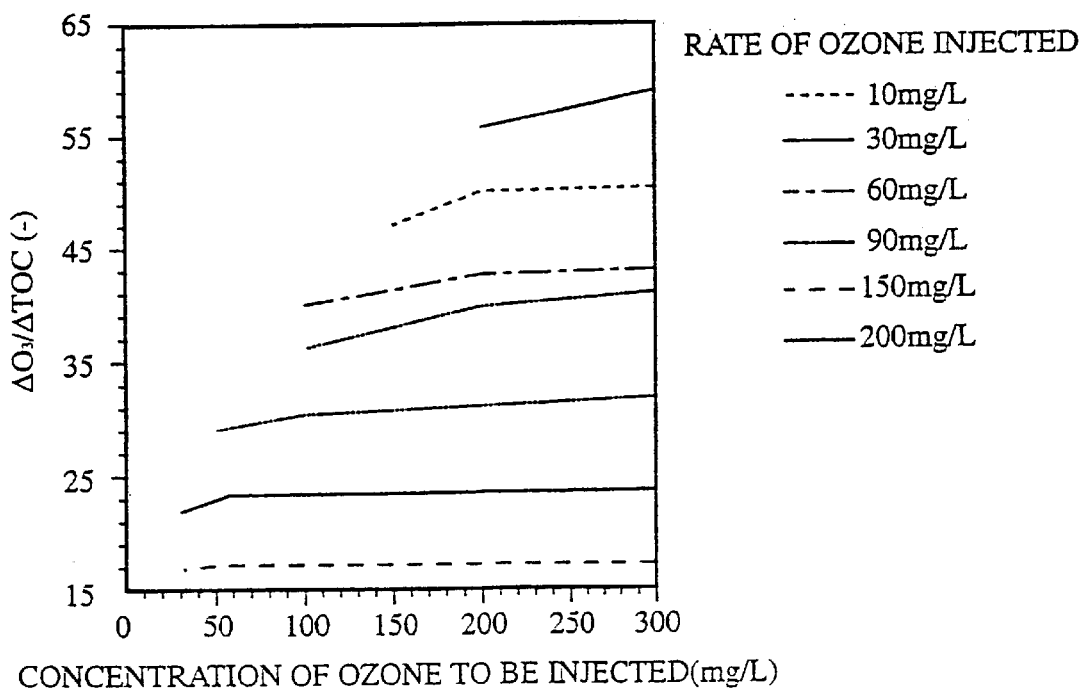
FIG. 4 shows the ratio of $\Delta O_3/\Delta TOC$ of effluent as a function of the concentration of ozone to be injected at various rates of ozone injected.

FIG. 4 shows the ratio of $\Delta O_3/\Delta TOC$ of effluent, after the ozone treatment using ozone mixed with hydrogen peroxide, as a function of the concentration of ozone to be injected, obtained under the same conditions as that of FIG. 3.

It can be seen from the figure that the value of $\Delta O_3/\Delta TOC$ does not change at a range over a certain value of the concentration of ozone to be injected. In fact, the values of $\Delta O_3/\Delta TOC$ are nearly constant at the ranges over 60, 100, 150, 180, 200, 250 mg of the concentration of zone to be injected, when the rates of ozone injected are 10, 30, 60, 90, 150, 200 mg/L, respectively.

From these facts, it can be concluded that there is a practical upper limit of concentration of ozone to be injected for each rate of ozone.

Figure 5:
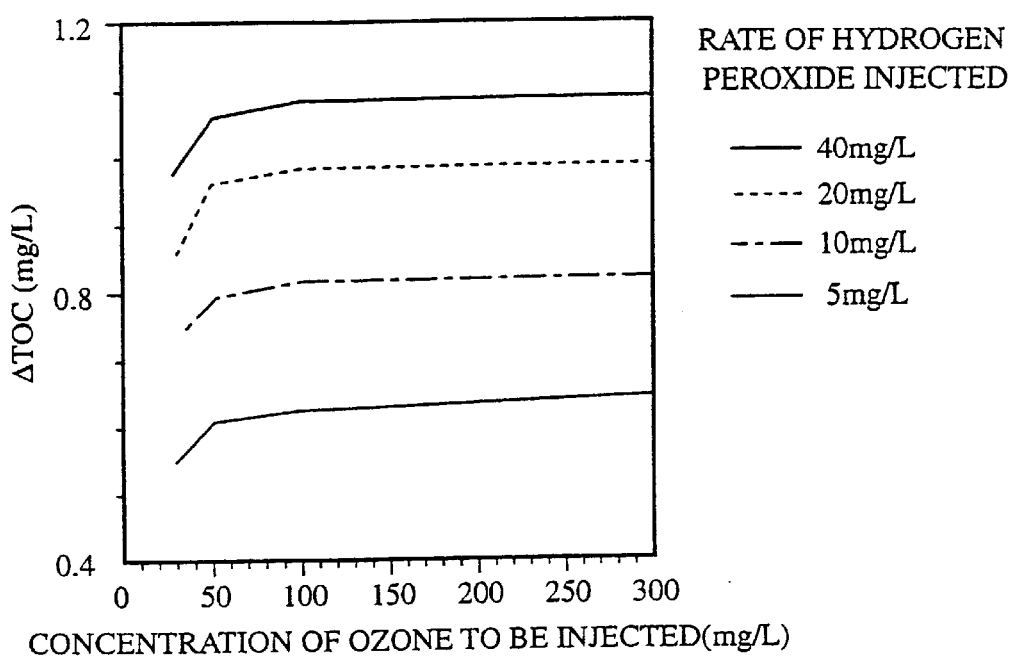
FIG. 5 shows the $\Delta TOC$ of effluent as a function of the concentration of ozone to be injected at various rates of hydrogen peroxide injected.

FIG. 5 shows the $\Delta$TOC of effluent, after the ozone treatment using ozone mixed with hydrogen peroxide, as a function of the concentration of ozone to be injected at various rates of hydrogen peroxide injected, when an ozone treatment of effluent (containing 6.0 mg/L of TOC) is performed using an apparatus shown in FIG. 1 under conditions that the rate of ozone injected is 30 mg/L and the rate of hydrogen peroxide injected is varied to be 5, 10, 20 and 40 mg/L.

It can be seen from the figure that the value of $\Delta$TOC is nearly constant at a range over 10 mg/L of the concentration of ozone to be injected, independent of the rate of hydrogen peroxide injected.

Figure 6:
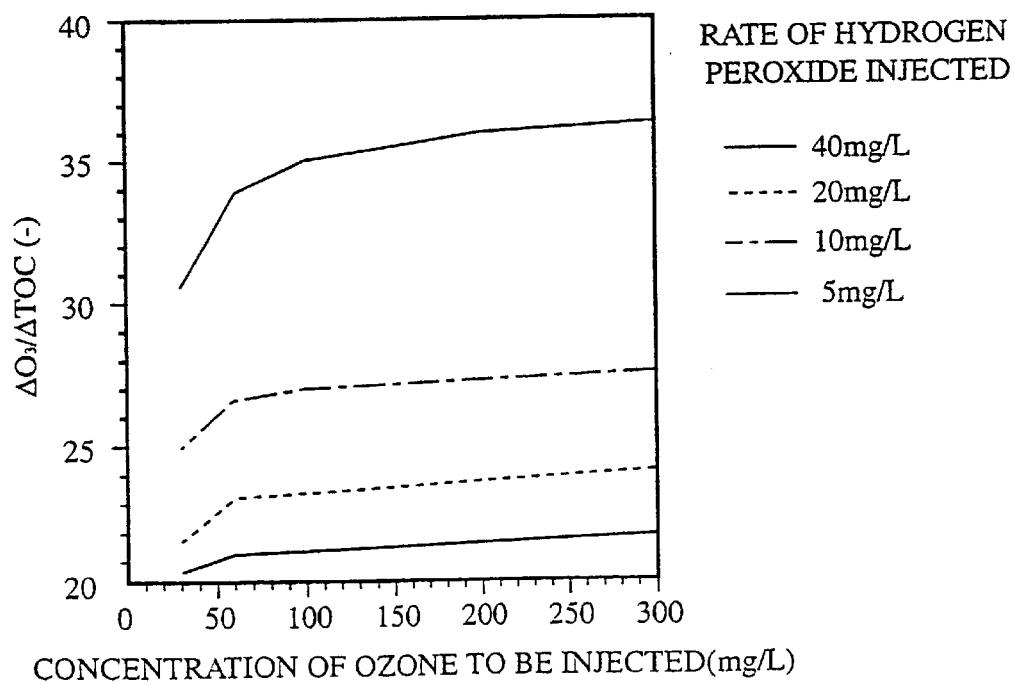
FIG. 6 shows the ratio $\Delta O_3/\Delta TOC$ of effluent as a function of the concentration of ozone to be injected at various rates of hydrogen peroxide injected.

FIG. 6 shows the ratio $\Delta O_3/\Delta TOC$ of effluent, after the ozone treatment using ozone mixed with hydrogen peroxide, as a function of the concentration of ozone to be injected, obtained under the same conditions as that of FIG. 5.

It can be seen from the figure that the value of $\Delta O_3/\Delta TOC$ is nearly constant at a range over 100 mg/L of the concentration of ozone to be injected, independent of the concentration of the hydrogen peroxide.

Figure 7:
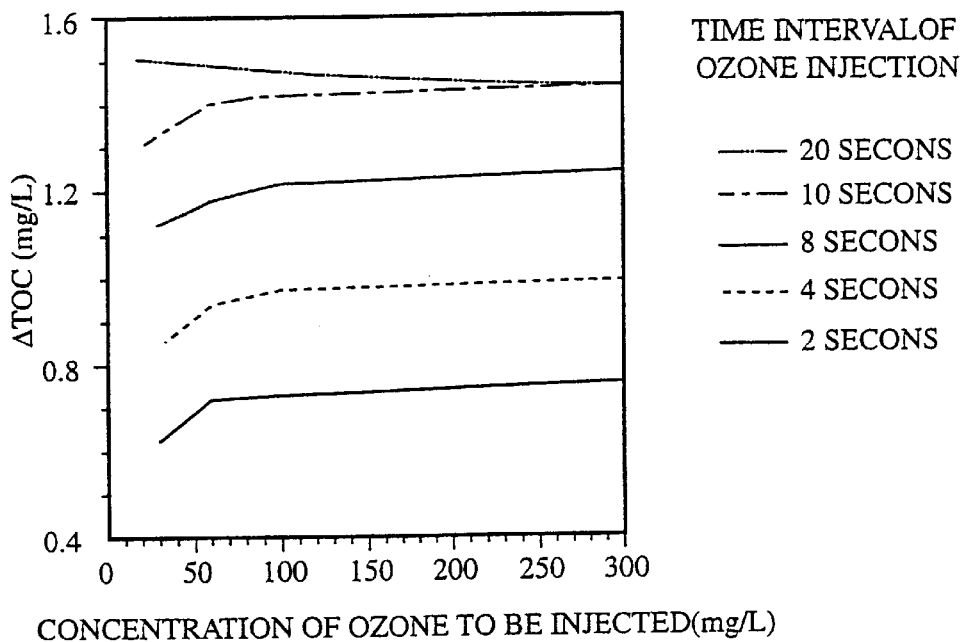
FIG. 7 shows the ΔTOC of effluent as a function of the concentration of ozone to be injected at various time intervals of ozone injection.

FIG. 7 shows the $\Delta$TOC of effluent, after the ozone treatment using ozone mixed with hydrogen peroxide, as a function of the concentration of ozone to be injected at various time intervals of ozone injection, when the ozone treatment of effluent (containing 6.0 mg/L of TOC) are performed using an apparatus shown in FIG. 1 under conditions that the rate of ozone injected is 30 mg/L, the rate of hydrogen peroxide injected is 20 mg/L and the time interval of ozone injection at the injection points is varied to be 2, 4, 8, 10, and 20 seconds.

It can be seen from the figure that the value of $\Delta$TOC is nearly constant at a range of the concentration of ozone to be injected over 100 mg, independent of the time interval of the ozone injection.

Figure 8:
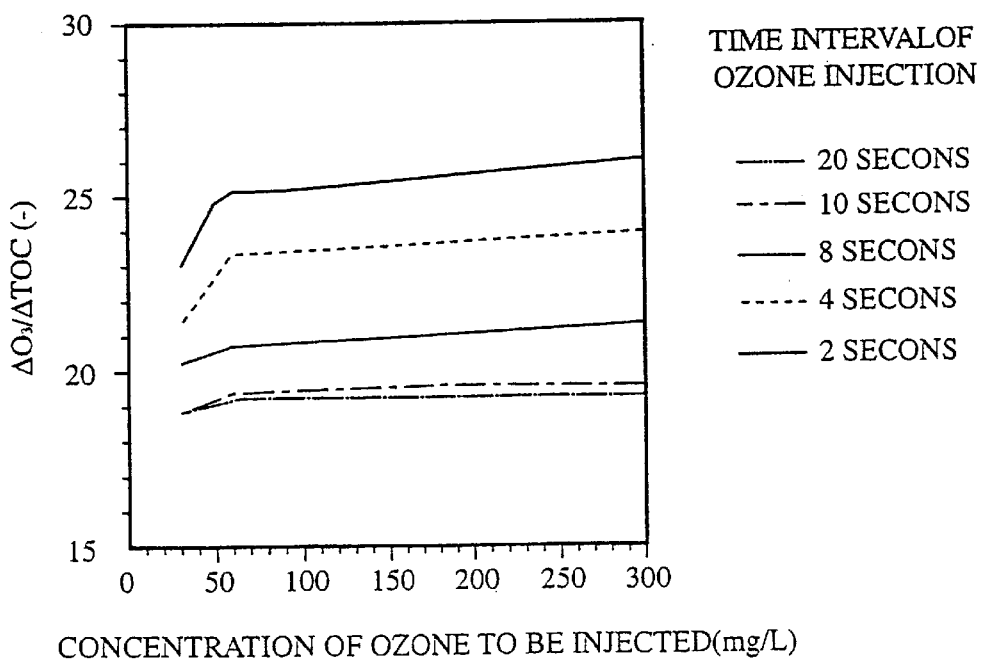
FIG. 8 shows the ratio $\Delta O_3/\Delta TOC$ of effluent as a function of the concentration of ozone to be injected at various time intervals of ozone injection.

FIG. 8 shows the ratio $\Delta O_3/\Delta TOC$ of effluent, after the ozone treatment using ozone mixed with hydrogen peroxide, as a function of the concentration of ozone to be injected, obtained under the same conditions as that of FIG. 7.

It can be seen from the figure that the value of $\Delta O_3/\Delta TOC$ is nearly constant at a range of the concentration of ozone to be injected over 100 mg/L, independent of the time interval of the ozone injection.

Figure 9:
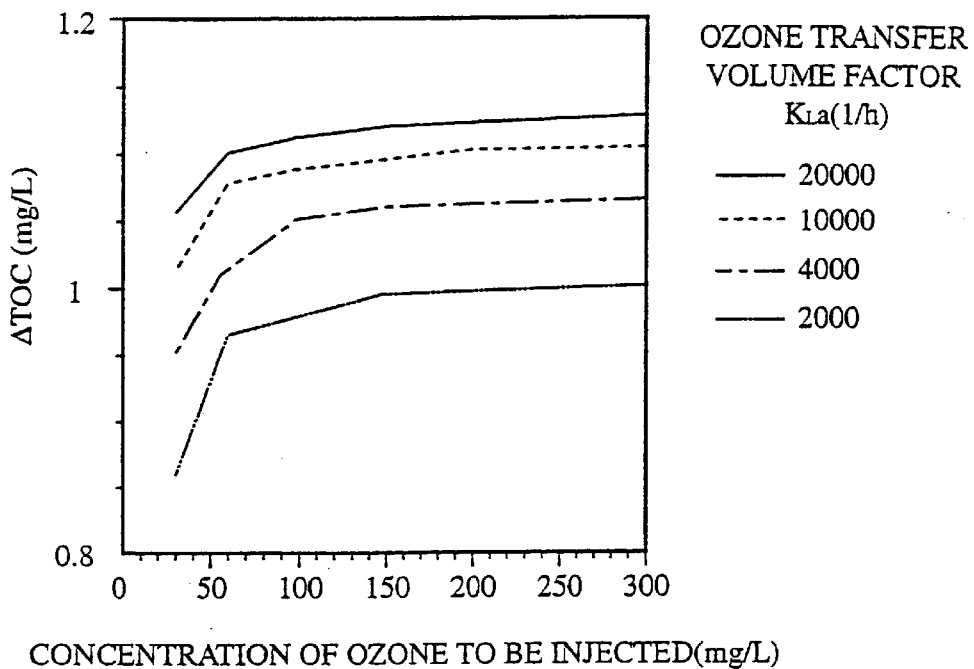
FIG. 9 shows the ΔTOC of effluent as a function of the concentration of ozone to be injected at various values of $K_L a$ at the injection points.

FIG. 9 shows the $\Delta$TOC of effluent, after the ozone treatment using ozone mixed with hydrogen peroxide, as a function of the concentration of ozone to be injected at various values of volumetric mass transfer coefficient of ozone, $K_L a$, when an ozone treatment of effluent (containing 6.0 mg of TOC) is performed using the apparatus shown in FIG. 1 under conditions that the rate of ozone injected is 30 mg/L, the rate of hydrogen peroxide injected is 20 mg/L, and the volumetric mass transfer coefficient $K_L a$ of ozone into the effluent at the injection points is varied to be 2000, 4000, 10000, 20000 (1/h).

It can be seen from the figure that the value of $\Delta$TOC is nearly constant at a range of the concentration of ozone to be injected over 100 mg/L, independent of the volumetric mass transfer coefficient of ozone $K_L a$.

Figure 10:
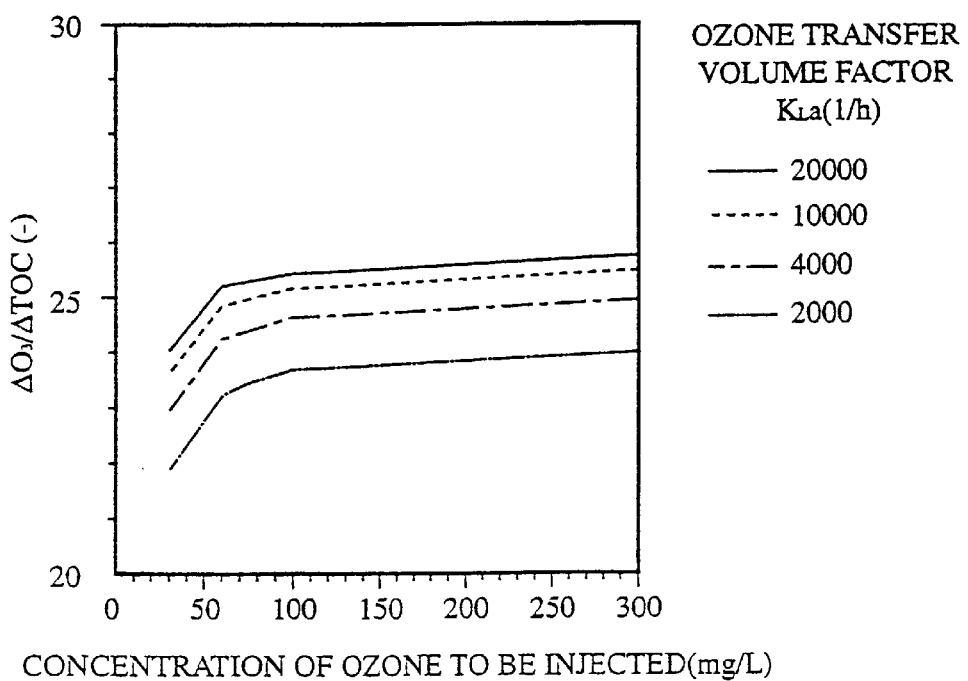
FIG. 10 shows the ratio $\Delta O_3/\Delta TOC$ of effluent as a function of the concentration of ozone to be injected at various values of $K_L a$ at the injection points.

FIG. 10 shows the ratio $\Delta O_3/\Delta TOC$ of effluent, after the ozone treatment using ozone mixed with hydrogen peroxide, as a function of the concentration of ozone to be injected, obtained under the same conditions as that of FIG. 9.

It can be seen from the figure that the ratio $\Delta O_3/\Delta TOC$ is nearly constant at a range of the concentration of ozone to be injected over 100 mg/L, independent from the volumetric mass transfer coefficient of ozone $K_L a$.

Figure 11:
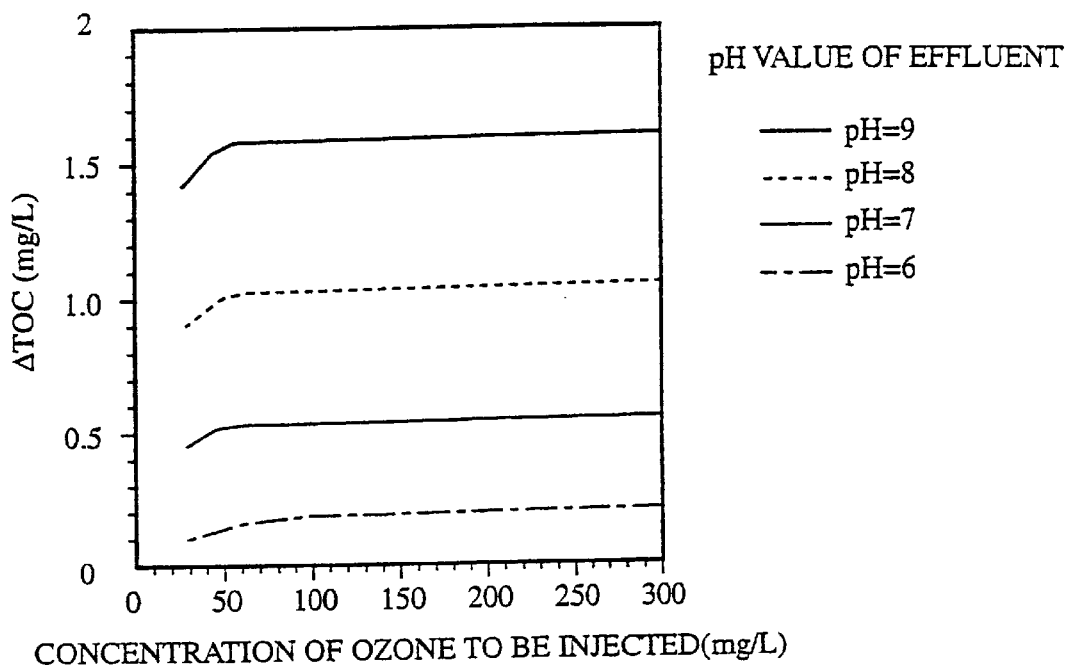
FIG. 11 shows the ΔTOC of effluent as a function of the concentration of ozone to be injected at various pH values of effluent.

FIG. 11 shows the $\Delta$TOC of effluent, after the ozone treatment using ozone mixed with hydrogen peroxide, as a function of the concentration of ozone to be injected at various pH values, when an ozone treatment of effluent (containing 6.0 mg/L of TOC) is performed using the apparatus shown in FIG. 1 under conditions that the rate of ozone injected is 30 mg/L, the rate of hydrogen peroxide injected is 20 mg/L, and the pH value of the effluent is varied to be 6, 7, 8 and 9.

It can be seen from the figure that the value of $\Delta$TOC is nearly constant at a range of the concentration of ozone to be injected over 100 mg/L, independent of the pH value of the effluent.

Figure 12:
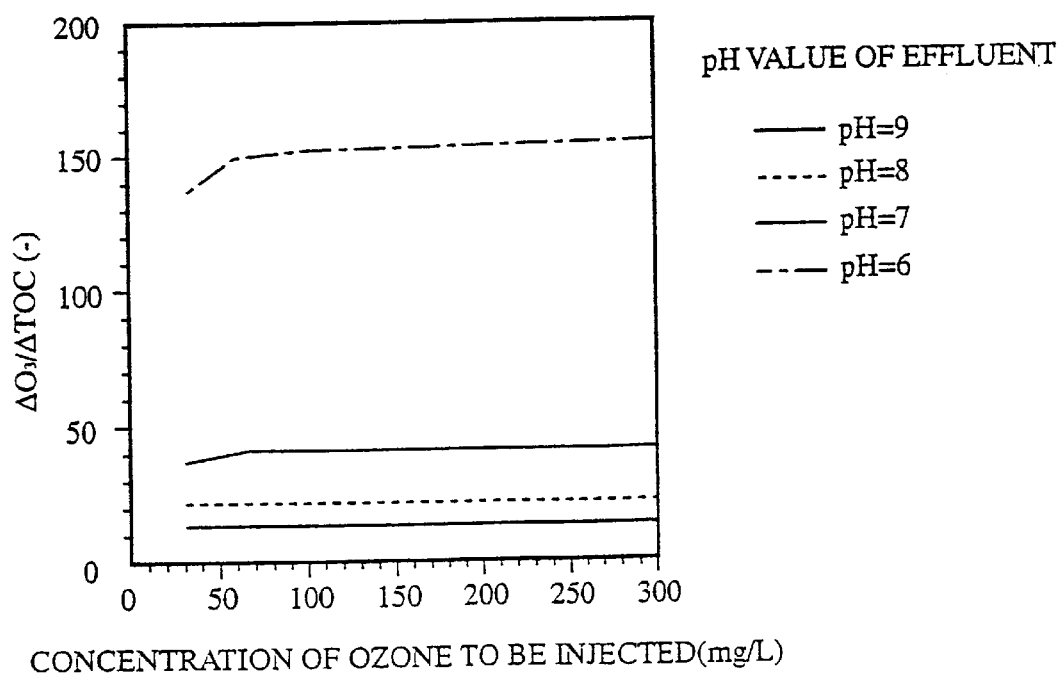
FIG. 12 shows the ratio $\Delta O_3/\Delta TOC$ of effluent as a function of the concentration of ozone to be injected at various pH values of effluent.

FIG. 12 shows the ratio $\Delta O_3/\Delta TOC$ of effluent, after the ozone treatment using ozone mixed with hydrogen peroxide, as a function of the concentration of ozone to be injected, obtained under the same conditions as that of FIG. 11.

It can be seen from the figure that the ratio $\Delta O_3/\Delta TOC$ does not change at a range of the concentration of ozone to be injected over 100 mg/L, independent of the pH value of the effluent.

Figure 13:
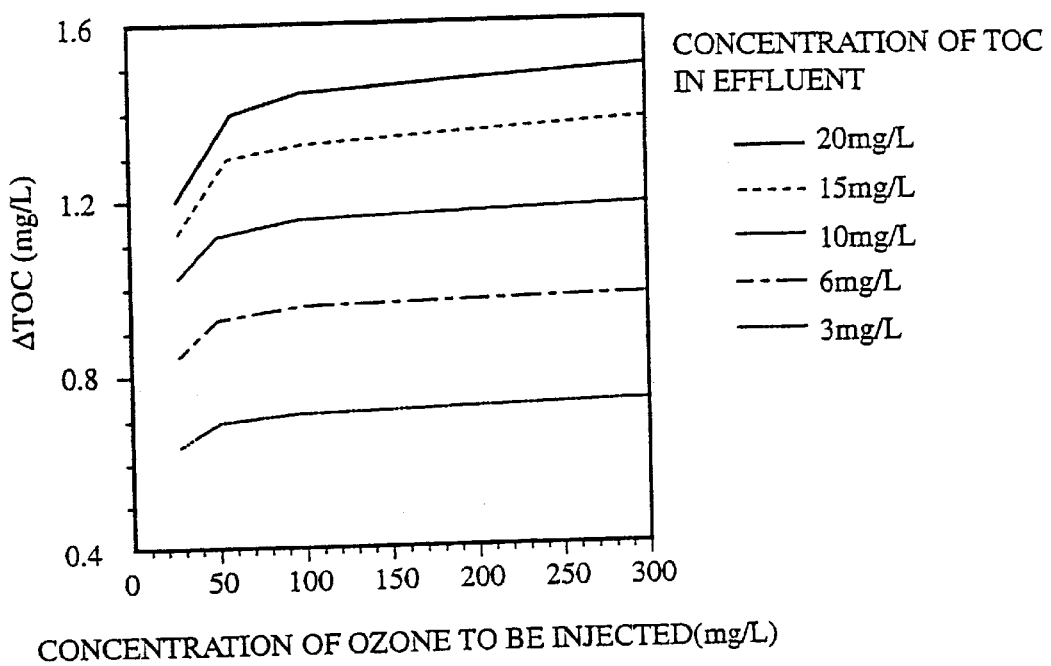
FIG. 13 shows the ΔTOC of effluent as a function of the concentration of ozone to be injected at various concentrations of TOC of effluent.

FIG. 13 shows the $\Delta$TOC of effluent, after the ozone treatment using ozone mixed with hydrogen peroxide, as a function of the concentration of ozone to be injected at various concentration of TOC, when an ozone treatment of effluent are accomplished using the apparatus shown in FIG. 1 under conditions that the rate of ozone injected is 30 mg/L, the rate of hydrogen peroxide injected is 20 mg/L, and TOC in the effluent is varied to be 3, 6, 10, 15 and 20 mg/L.

It can be seen from the figure that the value of ΔTOC is nearly constant at a range of the concentration of ozone to be injected over 100 mg/L, independent of the value of TOC in the effluent.

Figure 14:
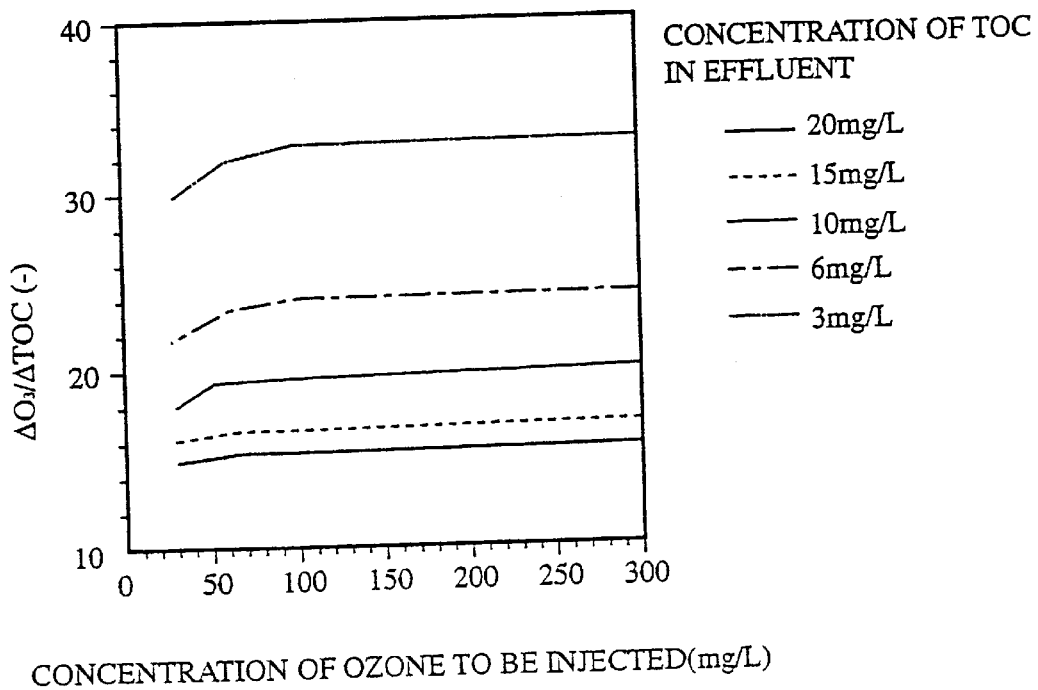
FIG. 14 shows the ratio $\Delta O_3/\Delta TOC$ of effluent as a function of the concentration of ozone to be injected at various concentrations of TOC of effluent.

FIG. 14 shows the ratio ΔO$_3$/ΔTOC of effluent, after the ozone treatment using ozone mixed with hydrogen peroxide, as a function of the concentration of ozone to be injected, obtained under the same conditions as that of FIG. 13.

It can be seen from the figure that the ratio ΔO$_3$/ΔTOC does not change at a range of the concentration of ozone to be injected over 100 mg/L, the value of TOC in the effluent.

From the results of these simulations, in which the value of several parameters are varied within a range which covers the values that may take place in practical cases, we, the inventors, deduced as follows:

An applicable and practical condition for the ozone treatment using ozone mixed with hydrogen peroxide is that the concentration of ozone to be injected is 30–300 mg/L, irrespective to the rate of ozone injected, the rate of hydrogen peroxide injected, the value of $K_La$, the quality of effluent (for example, pH value, or concentration of TOC), or the time interval of ozone injection.

When the concentration of ozone to be injected is less than 30 mg/L, the quantity of ΔTOC is rather small, thus, such an ozone treatment is meaningless. On the other hand, when the concentration of ozone to be injected is more than 300 mg/L, the efficiency of the ozone treatment is no more improved, though a large scaled ozone generating apparatus is necessary, which consumes a great deal of electric power. Additionally, in such a case, the mixing of ozone into effluent is difficult.

It can be concluded that the high degree ozone treatment using ozone mixed with hydrogen peroxide can be applicable and practical for the first time, by the method and apparatus of the present invention, in which ozone gas with a concentration of 30–300 mg/L and a certain amount of hydrogen peroxide are injected into effluent. The ozone treatment according to the present invention allows a reduction in the quantity of ozone required to decompose and remove a unit quantity of the organic compounds. And a high rate ozone treatment with high decomposition and removal efficiency becomes possible.

Embodiment 2

Figure 15:
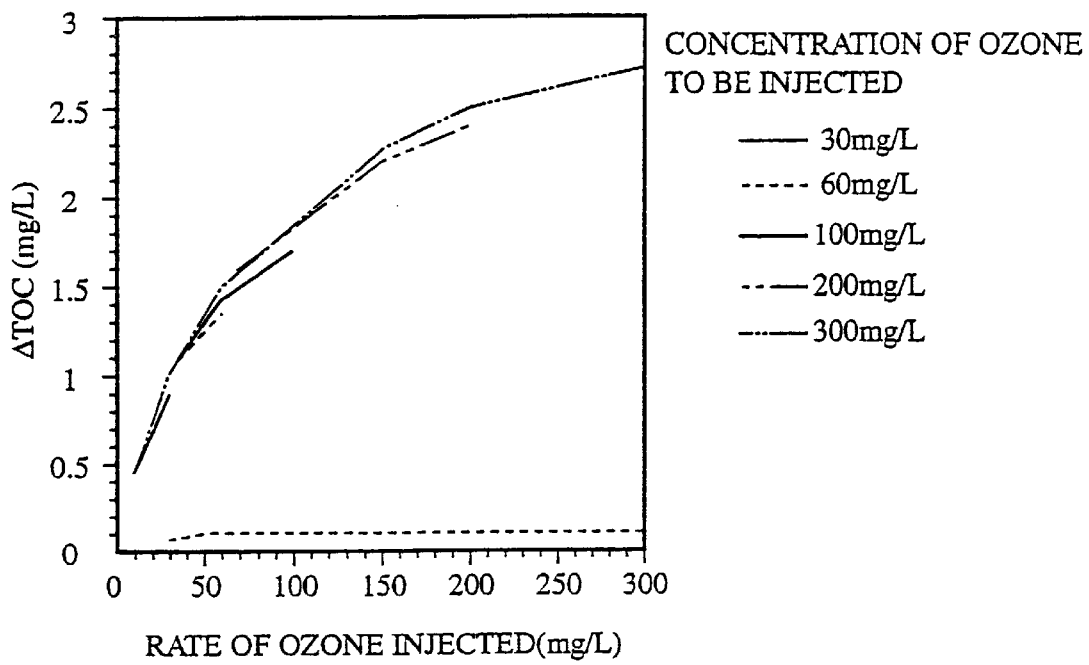
FIG. 15 shows the ΔTOC of effluent as a function of the rate of ozone injected at various concentrations of ozone to be injected.
Figure 16:
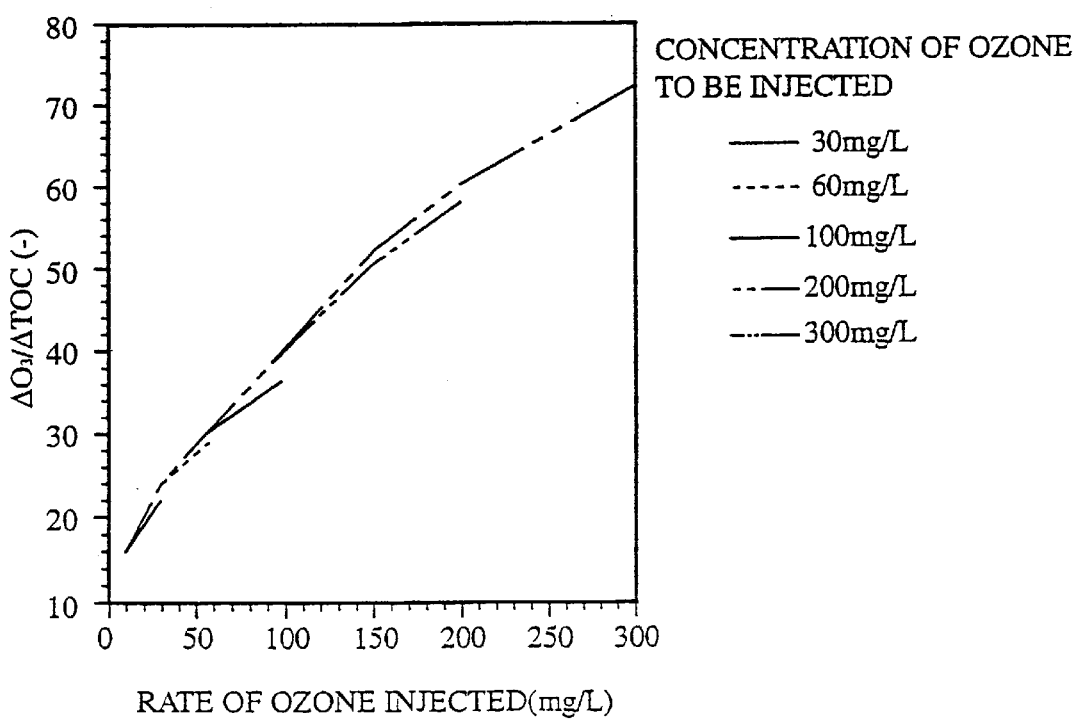
FIG. 16 show the $\Delta O_3/\Delta TOC$ of effluent as a function of the rate of ozone injected at various concentrations of ozone to be injected.

FIGS. 15 and 16 show the ΔTOC and ΔO$_3$/ΔTOC of effluent as a function of the rate of ozone injected at various concentrations of ozone to be injected, respectively, after the ozone treatment by ozone mixed with hydrogen peroxide, when an ozone treatment of effluent (containing 6.0 mg/L of TOC) is performed using the apparatus shown in FIG. 1 under conditions that the rate of hydrogen peroxide injected is 20 mg/L, the concentration of ozone to be injected is varied to be 30, 60, 100, 200, 300 mg/L.

It can be seen from the figures that the increasing tendency of ΔTOC becomes small at a range of the rate of ozone injected over 150 mg/L, and the value of ΔO$_3$/ΔTOC increases according to the increase of the rate of ozone injected. As a result, the ozone performance decreases in this range.

Further, we performed similar simulations, in which the parameter was replaced from "the concentration of ozone to be injected" to "the rate of hydrogen peroxide injected", "the time interval of ozone injection", "the value of $K_La$" and "the quality of effluent (pH value, concentration of TOC), as were done in embodiment 1. And we obtained corresponding figures for those simulations. The figures corresponding to those simulations resemble to FIGS. 15, and 16, namely, they showed that the increasing tendency of ΔTOC becomes small at a range of the rate of ozone injected.

From the results of those simulations, in which the value of several parameters are varied within a range which covers the values that may take place in practical cases, we, the inventors, deduced as follows:

An applicable and practical condition for the ozone treatment using ozone mixed with hydrogen peroxide is that the rate of ozone injected is 10–150 mg/L, irrespective to the concentration of ozone to be injected, the rate of hydrogen peroxide injected, the time interval of ozone injection, the value of $K_La$, the quality of effluent (pH value, concentration of TOC). When the rate of ozone injected is less than 10 mg/L, quantity of ΔTOC is rather small, thus, such an ozone treatment is meaningless. On the other hand, when the rate of ozone injected is more than 150 mg/L, the efficiency of the ozone treatment is no more improved, though a large scale ozone generating apparatus is necessary, which consumes a great deal of electric power.

Embodiment 3

The following mathematical relation stands between the concentration of ozone to be injected, the rate of ozone injected, and the flow rate ratio (flow rate of ozone/flow rate of effluent):

Flow rate ratio=Rate of ozone injected/Concentration of ozone to be injected.

The flow rate ratio is determined by dividing the rate of ozone injected by the concentration of ozone to be injected. However, in actual operation of ozone injection, the operation condition is determined from the concentration of ozone to be injected and the flow rate ratio, rather than from the concentration of ozone injected and the rate of ozone injected.

When the concentration of ozone to be injected and the rate of ozone injected range as explained in embodiments 1 and 2, the flow rate ratio (rate of ozone injected/concentration of ozone to be injected) ranges from 0.1 to 1.0. And, effluent can be effectively treated, by setting the flow rate ratio in this range.

Embodiment 4

Figure 17:
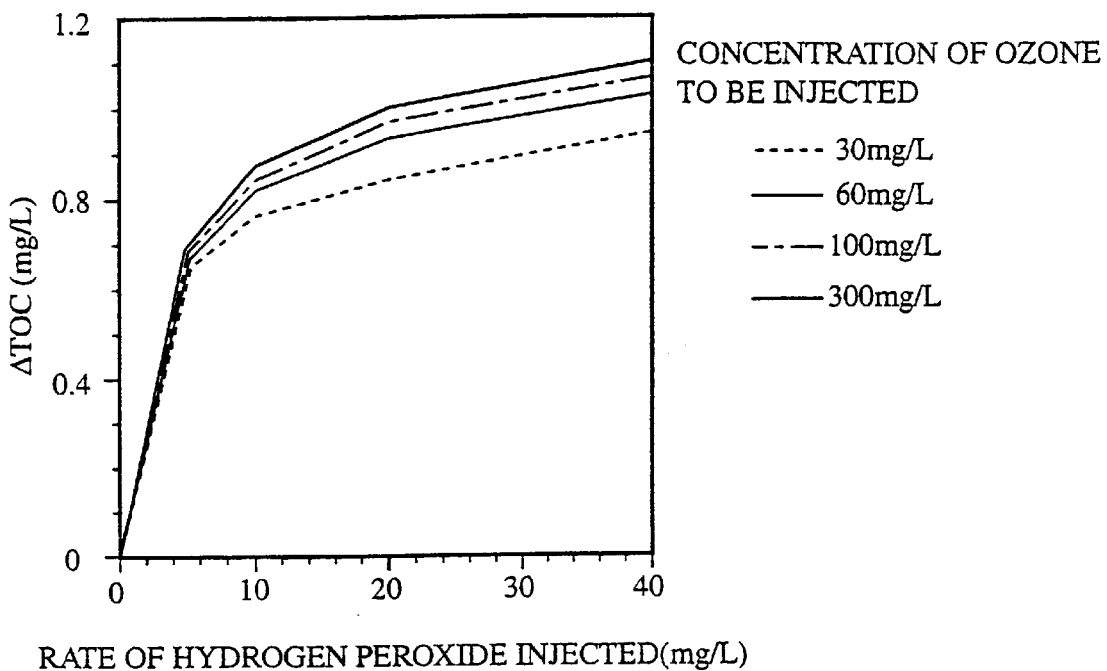
FIG. 17 shows the ΔTOC and $\Delta O_3/\Delta TOC$ of effluent as a function of the concentration of hydrogen peroxide to be injected at various concentrations of ozone to be injected.
Figure 18:
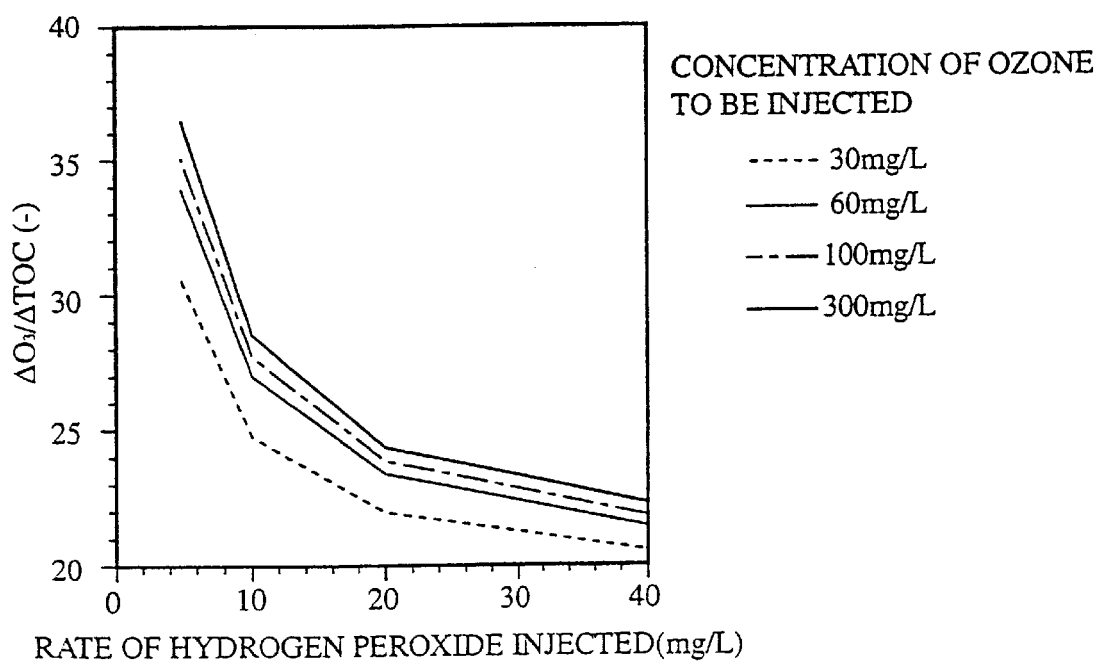
FIG. 18 shows the $\Delta O_3/\Delta TOC$ of effluent as a function of the concentration of hydrogen peroxide to be injected at various concentrations of ozone to be injected.

FIGS. 17 and 18 show the ΔTOC and ΔO$_3$/ΔTOC of effluent as a function of the rate of hydrogen peroxide injected at various concentrations of ozone to be injected, respectively, when an hydrogen peroxide treatment of effluent (containing 6.0 mg/L of TOC) is performed using the apparatus shown in FIG. 1 under conditions that the rate of hydrogen peroxide injected is 30 mg/L, the concentration of ozone to be injected is varied to be 30, 60, 100, 200, 300 mg/L.

It can be seen from the figures that the ΔTOC and ΔO$_3$/ΔTOC are nearly constant at a range of the rate of hydrogen peroxide injected over 40 mg/L.

Further, we performed similar simulations, in which the parameter was replaced from "the concentration of ozone to be injected" to "the rate of ozone injected", "the time interval of ozone injection", "the value of $K_La$" and "the quality of effluent (pH value, concentration of TOC), as was done in the embodiment 1. And we obtained corresponding figures for those simulations. The figures corresponding to those simulations resembles to FIGS. 17, and 18, namely, they showed that ΔTOC and ΔO$_3$/ΔTOC are nearly constant at the range of the rate of hydrogen peroxide injected over 40 mg/L.

From the results of those simulations, in which the value of several parameters are varied within a range which covers the values that may take place in practical cases, we, the inventors, deduced as follows:

An applicable and practical condition for the ozone treatment using ozone mixed with hydrogen peroxide, without wasting hydrogen peroxide, is that the rate of hydrogen peroxide injected is 1 to 50 mg/L, irrespective to the rate of ozone injected, the concentration of ozone to be injected, the time interval of ozone injection, the value of $K_La$, the quality of effluent (pH value, concentration of TOC). When the rate of ozone injected is less than 1 mg/L, the quantity of $\Delta$TOC is rather small, thus, such an ozone treatment is meaningless. On the other hand, when the rate of ozone injected is more than 50 mg/L, the cost for treatment increases, because of the use of a great amount of hydrogen peroxide. Additionally, in such a case, a great amount of hydrogen peroxide rests in the treated water. Thus, it is not preferable to use hydrogen peroxide excessively.

Embodiment 5

Figure 19:
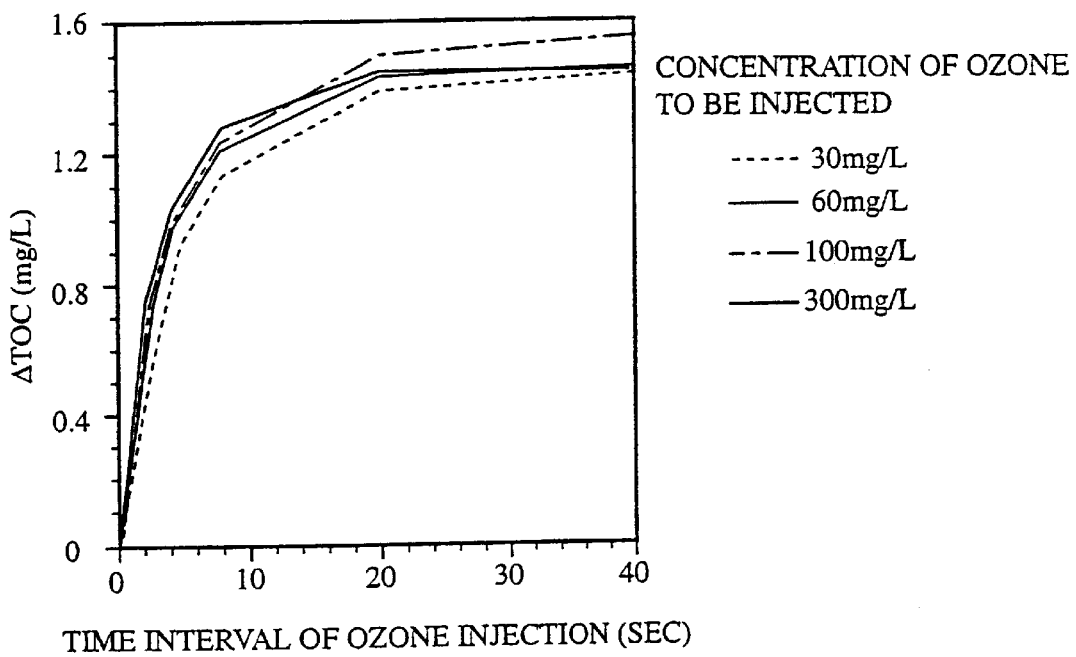
FIG. 19 shows the ΔTOC of effluent as a function of the time interval of ozone injection at various concentrations of ozone to be injected.
Figure 20:
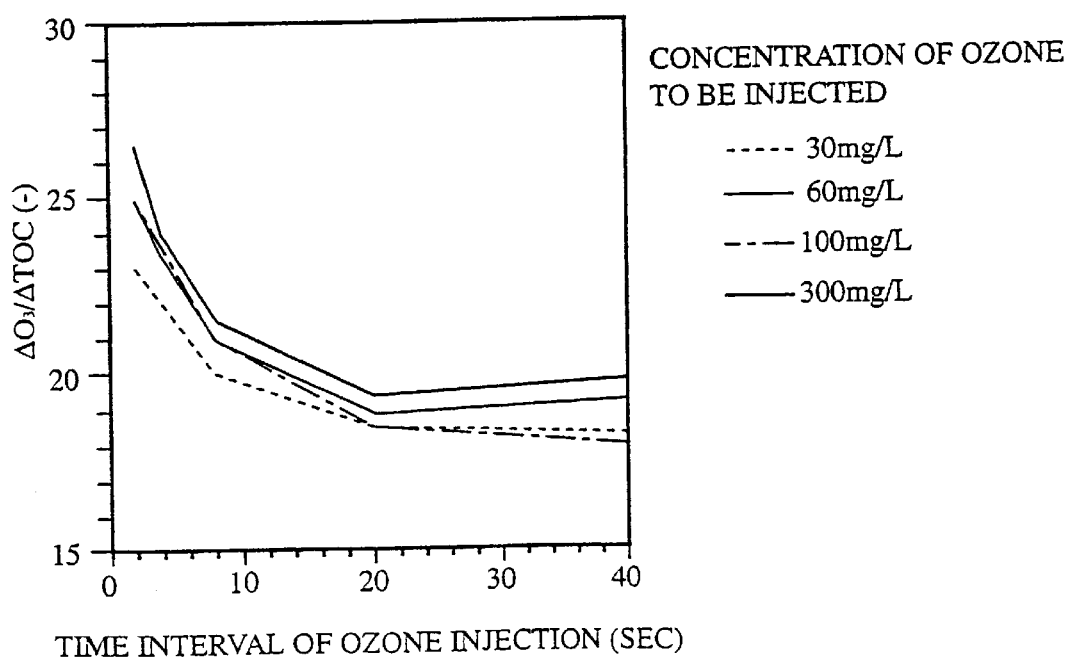
FIG. 20 shows the $\Delta O_3/\Delta TOC$ of effluent as a function of the time interval of ozone injection at various concentrations of ozone to be injected.

FIGS. 19 and 20 show the $\Delta$TOC and $\Delta O_3/\Delta$TOC of effluent as a function of the time interval of ozone injection at various concentrations of ozone to be injected, respectively, when an ozone treatment of effluent (containing 6.0 mg/L of TOC) is performed using the apparatus shown in FIG. 1 under conditions that the rate of ozone injected is 30 mg/L, the rate hydrogen peroxide to be injected is 20 mg/L, the concentration of ozone to be injected is varied to be 30, 60, 100, 200, 300 mg/L.

It can be seen from the figures that the $\Delta$TOC and $\Delta O_3/\Delta$TOC are nearly constant at the range of the time interval of ozone injection over 20 seconds.

Further, we performed similar simulations, in which the parameter was replaced from "the concentration of ozone to be injected" to "the rate of ozone injected", "the rate of hydrogen peroxide", "the value of $K_La$" and "the quality of effluent (pH value, concentration of TOC), as were done in the embodiment 1. And we obtained corresponding figures for those simulations. The figures corresponding to those simulations resemble FIGS. 19, and 20, namely, they showed that $\Delta$TOC and $\Delta O_3/\Delta$TOC are nearly constant at a range of the time interval of ozone injection over 20 seconds.

From the results of those simulations, in which the value of several parameters are varied within a range which covers the values that may take place in practical cases, we, the inventors, deduced as follows:

An applicable and practical condition for the ozone treatment using ozone mixed with hydrogen peroxide is that the time interval ozone injection is 5–40 seconds, irrespective to the rate of ozone injected, the concentration of ozone to be injected, the rate of hydrogen peroxide, the value of $K_La$, and the quality of effluent (pH value, concentration of TOC). When the time interval of ozone injection is shorter than 5 seconds, the reaction is insufficient. On the other hand, when the time interval is longer than 40 seconds, it is difficult to make the apparatus compact.

Embodiment 6

Figure 21:
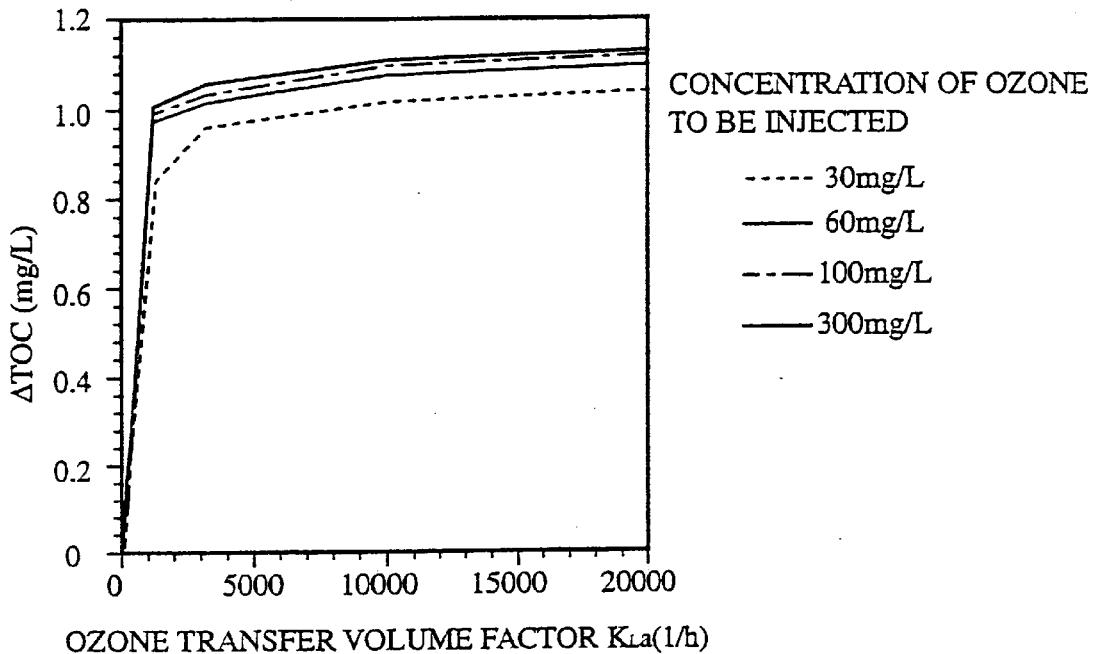
FIG. 21 shows the ΔTOC of effluent as a function of the value of $K_L a$ at the ozone injection points, at various concentrations of ozone to be injected.
Figure 22:
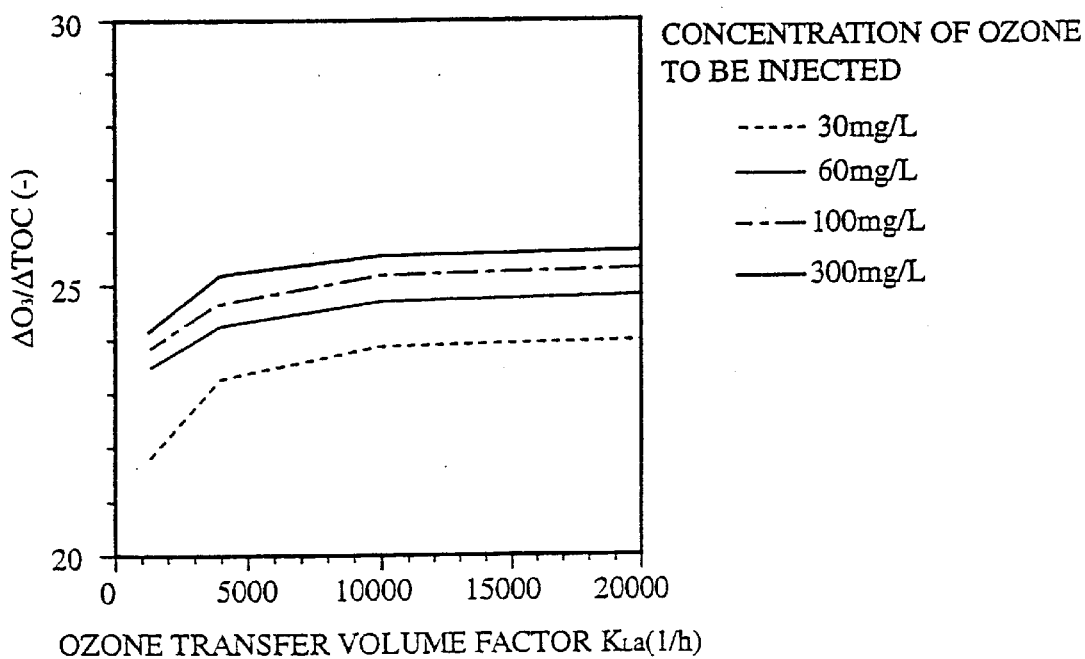
FIG. 22 shows the $\Delta O_3/\Delta TOC$ of effluent as a function of the value of $K_L a$ at the ozone injection points, at various concentrations of ozone to be injected.

FIGS. 21 and 22 show the $\Delta$TOC and $\Delta O_3/\Delta$TOC of effluent as a function of the value of $K_La$ at the ozone injection points, at various concentrations of ozone to be injected, respectively, when an ozone treatment of effluent (containing 6.0 mg/L of TOC) is performed using the apparatus shown in FIG. 1 under conditions that the rate of ozone injected is 30 mg/L, the rate hydrogen peroxide to be injected is 20 mg/L, and the concentration of ozone to be injected is varied to be 30, 60, 100, 200, 300 mg/L.

It can be seen from the figures that the $\Delta$TOC and $\Delta O_3/\Delta$TOC are nearly constant at a range of the value $K_La$ at the ozone injection points.

Further, we performed similar simulations, in which the parameter was replaced from "the concentration of ozone to be injected" to "the rate of ozone injected", "the time interval of ozone injection", "the rate of hydrogen peroxide", and "the quality of effluent (pH value, concentration of TOC), as was done in the embodiment 1. And we obtained corresponding figures for those simulations. The figures corresponding to those simulations resemble to FIGS. 21, and 22, namely, they showed that $\Delta$TOC and $\Delta O_3/\Delta$TOC are nearly constant at the range of the value $K_La$ over 10,000.

From the results of those simulations, in which the value of several parameters are varied within a range which covers the values that may take place in practical cases, we, the inventors, deduced as follows:

An applicable and practical condition for an effective ozone treatment using ozone mixed with hydrogen peroxide, is that the value $K_La$ is 100 to 10 000 (l/h), irrespective to the rate of ozone injected, the concentration of ozone to be injected, the rate of hydrogen peroxide, the time interval of ozone injection, and the quality of effluent (pH value, concentration of TOC). When the value of $K_La$ is smaller than 100, the resolution of ozone into effluent is insufficient. On the other hand, the efficiency of the ozone treatment be improved in a range over 10 000. Thus, it is not preferable to set the value $K_La$ in too small or too large ranges.

The term "volumetric mass transfer coefficient of ozone $K_La$" means "a product of a liquid-side mass transfer coefficient of ozone $K_L$ and a specific interfacial area a" in this specification and claims. The term "specific interfacial area a" means "a gas/liquid contact area per unit volume of a reaction tower".

What is claimed is:

1. A method of ozone treatment including injecting hydrogen peroxide into an aqueous effluent in substantially laminar flow, the aqueous effluent including organic compounds, and injecting ozone gas into the aqueous effluent at at least two ozone injection points, located at intervals, after injecting the hydrogen peroxide into the aqueous effluent, wherein ozone concentration in the ozone gas injected from the ozone injection points ranges from 30 to 60 mg/L.

2. A method of ozone treatment including injecting hydrogen peroxide into an aqueous effluent in substantially laminar flow, the aqueous effluent including organic compounds, and injecting ozone gas into the aqueous effluent at at least two ozone injection points, located at intervals after injecting the hydrogen peroxide into the aqueous effluent, wherein ozone injection rate ranges from 10 to 30 mg/L.

3. A method of ozone treatment including injecting hydrogen peroxide into an aqueous effluent in substantially laminar flow, the aqueous effluent including organic compounds, and injecting ozone gas into the aqueous effluent at at least two ozone injection points, located at intervals, after injecting the hydrogen peroxide into the aqueous effluent, wherein a volume ratio of ozone gas flow rate to effluent flow rate ranges from 0.1 to 0.4.

4. A method of ozone treatment including injecting hydrogen peroxide into an aqueous effluent in substantially laminar flow, the aqueous effluent including organic compounds, and injecting ozone gas into the aqueous effluent at at least two ozone injection points, located at intervals, after injecting the hydrogen peroxide into the aqueous effluent, wherein hydrogen peroxide injection rate ranges from 1 to 10 mg/L.

5. A method of ozone treatment including injecting hydrogen peroxide into an aqueous effluent in substantially laminar flow, the aqueous effluent including organic compounds, and injecting ozone gas into the aqueous effluent at at least two ozone injection points, located at intervals, after injecting the hydrogen peroxide into the aqueous effluent, further including injecting the ozone gas injection at time intervals ranging from 5 to 40 seconds.

* * * * *